Feb. 11, 1936. C. STANSBURY Re. 19,853
MOTOR CONTROLLER
Original Filed May 24, 1934
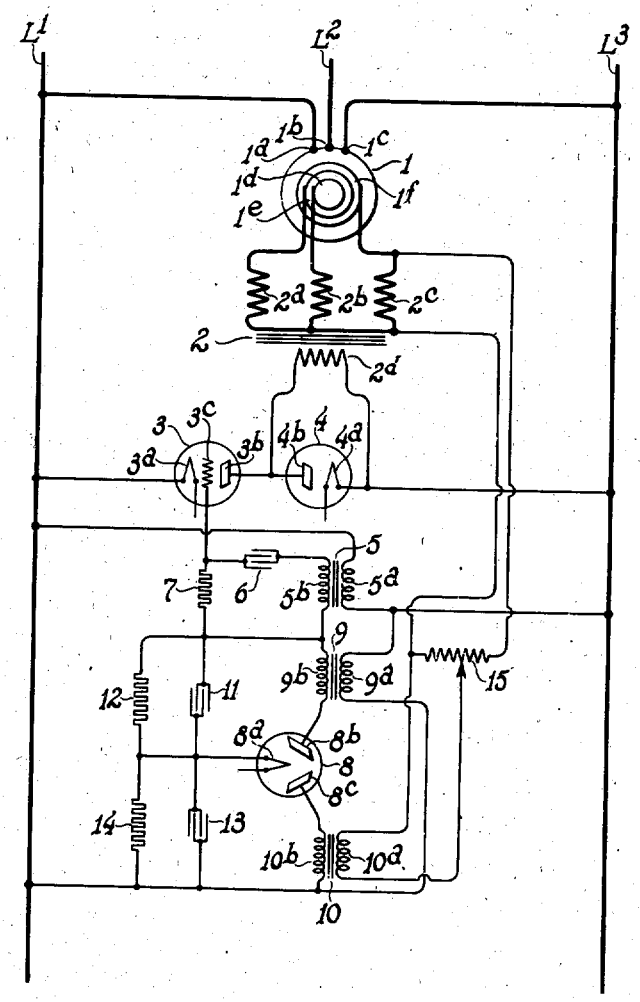
Inventor
Carroll Stansbury
By [illegible]
Attorney Reissued Feb. 11, 1936 Re. 19,853

UNITED STATES PATENT OFFICE 19,853

MOTOR CONTROLLER

Carroll Stansbury, Wauwatosa, Wis., assignor to Cutler-Hammer, Inc., Milwaukee, Wis., a corporation of Delaware Original No. 2,013,221, dated September 3, 1935, Serial No. 727,213, May 24, 1934. Application for reissue October 24, 1935, Serial No. 46,599

8 Claims. (Cl. 172—274)

This invention relates to control systems and more particularly to regulating systems for controlling the speed of motors.

Among the objects of the invention is the provision of means for maintaining the speed of motors constant at any desired preselected value.

Another object is to provide a speed controlling device of the aforementioned character employing electronic tubes to perform the regulating and controlling functions.

Another object is to provide a controller which permits of accurate speed control of a motor under widely varying load conditions.

Another object is to provide a controller which affords accurate speed control under rapidly varying load conditions.

Another object is to provide a controller which accomplishes the aforementioned results when the motor operates at a relatively low speed.

Another object is to provide a controller which has no mechanically moving elements which are required to respond to the controlling impulses.

Another object is to provide a controller which requires no arc interrupting contacts to open and close circuits of high voltage or magnitude.

Another object is to provide a controller which is rapid and accurate in response to changes in operating conditions.

Other objects and advantages will hereinafter appear.

As is well known, the speed of alternating current motors may be varied by varying the impedance of the primary or of the secondary circuit. Various means have been proposed for the variation of such impedance, one of such means consisting of connecting in series with a winding of the motor a so-called saturable reactor in which the impedance of a coil connected in an alternating current circuit is varied by superimposing upon the flux created by the alternating current flowing in said coil a direct current flux induced in the same magnetic structure by a unidirectional current flowing in another coil. The use of such a saturable reactor is particularly advantageous where large powers have to be controlled, since a very small amount of energy in the direct current circuit will supply a controlling effect sufficient for controlling a very large motor. In the present system, automatic means have been provided whereby tendencies of an induction motor to depart from a desired speed immediately affect an electronic tube which, in turn, instantaneously varies the direct current of the saturable reactor to thereby vary the motor characteristic to thus check departures of the motor speed from the desired value substantially in their incipiency.

The accompanying drawing is illustrative of one type of system embodying my invention.

In the drawing, lines $L^1$, $L^2$ and $L^3$ designate the terminals of a three phase alternating current supply system, 1 is a three phase slip ring type induction motor having a primary winding terminating in the terminals $1^a$, $1^b$, $1^c$ and secondary windings terminating in the slip rings $1^d$, $1^e$ and $1^f$. Connected in series with the secondary winding is a saturable reactor 2 having alternating current coils $2^a$, $2^b$ and $2^c$, which are connected in star between the slip rings $1^d$, $1^e$ and $1^f$, respectively. The reactor also has a direct current coil $2^d$. A gaseous electron tube 3 having a cathode $3^a$, an anode $3^b$ and a grid $3^c$ has its cathode connected to the line $L^1$ while the anode $3^b$ is connected to the anode $4^b$ of a rectifier 4 whose cathode $4^a$ is connected to the line $L^3$. The direct current winding $2^d$ is connected in parallel with the rectifier 4.

The system further includes a transformer 5 having a primary winding $5^a$ which is connected across the lines $L^1$ and $L^3$ and a secondary winding $5^b$ which is connected in series with a condenser 6 across the terminals of a resistor 7. The terminal of the resistor 7 which is common with the condenser 6 is also connected to the grid $3^c$. 8 is a full wave rectifier having a cathode $8^a$ and anodes $8^b$ and $8^c$. A transformer 9 has its primary winding $9^a$ connected across lines $L^1$ and $L^3$. The secondary winding $9^b$ of transformer winding 9 has one end connected to the anode $8^b$ while its other end is connected to the common terminal of the resistor 7 and the winding $5^b$. Between this latter terminal and the cathode $8^a$ are connected a condenser 11 and in parallel therewith a resistor 12. A third transformer 10 has a primary winding $10^a$ which is connected in shunt with a potentiometer resistor 15, the latter being connected across the coil $2^c$ while its secondary winding $10^b$ is connected between the line $L^1$ and the anode $8^c$. A condenser 13 and a parallel resistor 14 are connected between the line $L^1$ and the cathode $8^a$.

The system operates in the following manner:

When the lines $L^1$, $L^2$ and $L^3$ are energized the primary winding of motor 1 receives current and a voltage is induced in the secondary circuit so that a current flows through the windings $2^a$, $2^b$ and $2^c$ of the saturable reactor. The current through these windings depends upon the energization of the winding $2^d$, the impedance of the windings $2^a$, $2^b$ and $2^c$ increasing with decreasing current in the winding $2^d$. In other words, the higher the current in the winding $2^d$ the lower will be the impedance of the secondary circuit and the higher the motor speed for a given load. The current in the coil $2^d$ is controlled by controlling the instantaneous voltage of the grid $3^c$ during the positive half cycle of the voltage between the lines $L^1$ and $L^3$ during which the tube 3 permits current flow therethrough provided that the voltage of the grid $3^c$ is more positive than the critical grid voltage. The voltage of the grid $3^c$ with respect to the cathode $3^a$ at any moment is the resultant of the instantaneous voltage across the resistor 7, the condenser 11 and the condenser 13,—the three being in series. The voltage across the resistor 7 is a function of the voltage induced in the secondary winding $5^b$ of the transformer 5 whose primary is connected across the lines $L^1$ and $L^3$. The condenser 11 is charged by a voltage impressed upon it by the secondary winding $9^b$ of the transformer 9 through the electron tube 8, said voltage being proportional to the line voltage. The effective voltage of the condenser 11 is determined by the value of the resistance 12. By proper adjustment of this resistance and the condenser 11 the effective voltage of the latter will attain a certain desired value at a given moment during the positive half cycle.

A voltage opposite to that of condenser 11 is impressed upon the condenser 13 through the secondary winding $10^b$ of the transformer 10 whose primary winding $10^a$ is connected to the coil $2^c$ of the reactor through potentiometer 15. This voltage is a function of the adjustment of the resistor 14 and of the condenser 13 and of the motor speed.

By varying the adjustment of the potentiometer 15 to which is connected the primary winding $10^a$ of the transformer 10 the voltage impressed upon the winding $10^b$ can be adjusted with respect to the relatively fixed voltage which is the resultant of that of the condenser 11 and impedance 7 so that the critical value of the grid voltage is attained during any desired moment of the positive half cycle of the voltage impressed upon tube 3 and thus the strength of the current which is passed by the tube and which flows through the winding $2^d$ may be adjusted.

If for a given adjustment of the potentiometer 15 the motor should slow down due to changes in load its secondary voltage increases thereby increasing the voltage impressed upon the condenser 13 and making the grid $3^c$ more positive. This increases the effective current through the coil $2^d$, which, in turn, decreases the impedance of the coils $2^a$, $2^b$ and $2^c$ and causes the motor to speed up.

The rectifier 4 which is connected in parallel with the coil $2^d$ to smooth out the oscillations of the current flowing therein in a well known manner may be omitted under certain conditions.

It will thus be seen that for any given adjustment of the potentiometer 15 the system tends to maintain the speed of the motor constant, and that this speed may be varied between substantially zero and synchronous speed of the motor.

While I have shown the invention in connection with a wound rotor induction motor, it will be obvious to one skilled in the art that it may be used with other types of motors and that the reactor 2 may be connected to either the primary or secondary circuit of such motors.

What I claim as new and desire to secure as Letters Patent is:

1. In combination, a dynamo electric machine, a saturable reactor in circuit with a winding of said machine and having a control winding, an alternating current supply, an electron tube connected in circuit with said supply and said control winding and having a grid, and means to control the current in said control winding in accordance with a characteristic of said machine, said means comprising means to supply a unidirectional reference voltage to said grid, also means to supply a second unidirectional voltage to said grid which is a function of said characteristic of said machine and which is opposed to said reference voltage, and also means connected to said alternating current supply to superimpose an alternating voltage of a given phase relative to the voltage of said supply upon the resultant of said reference voltage and said second unidirectional voltage.

2. In combination, an alternating current supply line, a dynamo electric machine connected thereto, a saturable reactor in circuit with a winding of said machine and having a control winding, an electron tube connected in circuit with said supply line and said control winding and having a grid and means to control the current in said control winding in accordance with a characteristic of said machine, said means comprising means to supply a unidirectional reference voltage to said grid, also means to supply a second unidirectional voltage to said grid which is a function of said characteristic of said machine and which is opposed to said reference voltage, and also means to superimpose an alternating voltage of the frequency of the voltage of said supply line and of a given phase relative thereto upon the resultant of said reference voltage and said second unidirectional voltage.

3. In combination, an alternating current supply, a motor supplied thereby, a saturable reactor in circuit with a winding of said motor and having a control winding, an electron tube connected in circuit with said supply and said control winding and having a grid, and means to control the current in said control winding in accordance with a characteristic of said motor, said means comprising means to supply a unidirectional reference voltage to said grid, also means to supply a second unidirectional voltage to said grid which is a function of said characteristic of said motor and which is opposed to said reference voltage, and also means to superimpose an alternating voltage of the frequency of said supply and of a given phase relative to its voltage upon the resultant of said reference voltage and said second unidirectional voltage.

4. In combination, an alternating current supply, a motor supplied thereby, a saturable reactor in circuit with a winding of said motor and having a control winding, an electron tube connected in circuit with said supply and said control winding and having a grid, and means to control the current in said control winding in accordance with the speed of said motor, said means comprising means to supply a unidirectional reference voltage to said grid, also means to supply a second unidirectional voltage to said grid which is a function of the counter-electromotive force of said motor and which is opposed to said reference voltage, and also means to superimpose an alternating voltage of the frequency of said supply and of a given phase relative to its voltage upon the resultant of said reference voltage and said undirectional voltage.

5. In combination, an alternating current supply, a motor supplied thereby, a saturable reactor in circuit with a winding of said motor and having a control winding, an electron tube connected in circuit with said supply and said control winding and having a grid, and means to control the current in said control winding in accordance with the speed of said motor, said means comprising a rectifying circuit connected to said supply and adapted to supply a unidirectional reference voltage to said grid, also means to supply a second unidirectional voltage to said grid which is a function of the counter-electromotive force of said motor and which is opposed to said reference voltage, and also means to superimpose an alternating voltage of the frequency of said supply and of a given phase relative to its voltage upon said reference voltage and said second unidirectional voltage.

6. In combination, an alternating current supply, a motor supplied thereby, a saturable reactor in circuit with a winding of said motor and having a control winding, an electron tube connected in circuit with said supply and said control winding having a grid, and means to control the current in said control winding in accordance with the speed of said motor, said means comprising the means to supply a unidirectional reference voltage to said grid, a rectifying circuit connected to a winding of said motor and adapted to supply a second unidirectional voltage to said grid which is a function of the speed of said motor and which is opposed to said reference voltage, and also means to superimpose an alternating current voltage of the frequency of said supply and of a given phase relative to its voltage upon the resultant of said reference voltage and said second unidirectional voltage.

7. In combination, an alternating current supply, a motor supplied thereby, a saturable reactor in circuit with a winding of said motor and having a control winding, an electron tube connected in circuit with said supply and said control winding having a grid, and means to control the current in said control winding in accordance with the speed of said motor, said means comprising a rectifying circuit connected to said supply and adapted to supply a unidirectional reference voltage to said grid, and also a rectifying circuit connected to a winding of said motor and adapted to supply a second unidirectional voltage to said grid which is a function of the speed of said motor and which is opposed to said reference voltage, and also means to superimpose an alternating voltage of the frequency of said supply and of a given phase relative to its voltage upon the resultant of said reference voltage and said second unidirectional voltage.

8. In combination, an alternating current supply line, an induction motor supplied thereby, a saturable reactor in circuit with a winding of said motor and having a control winding, an electron tube connected in circuit with said supply and said control winding and having a grid and means to control the current in said control winding in accordance with the speed of said motor, said means comprising a rectifying circuit connected to said supply and adapted to supply a unidirectional reference voltage to said grid, also a rectifying circuit connected to said winding of said motor and adapted to supply a second unidirectional voltage to said grid which is a function of the speed of said motor and which is opposed to said reference voltage, and also means to superimpose an alternating voltage of the frequency of said supply and of a given phase relative to its voltage upon the resultant of said reference voltage and said second unidirectional voltage.

CARROLL STANSBURY.